United States Patent
Plöchl et al.

(10) Patent No.: US 6,565,988 B1
(45) Date of Patent: *May 20, 2003

(54) COMPOSITE FOR HIGH THERMAL STRESS

(75) Inventors: Laurenz Plöchl, Oberdrauburg (AT);
Florian Rainer, Lechaschau (AT)

(73) Assignee: Plansee Aktiengesellschaft, Tirol (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/566,573

(22) Filed: May 9, 2000

(30) Foreign Application Priority Data

May 21, 1999 (AU) .............................. 357/99 U

(51) Int. Cl.[7] .......................... B32B 15/01; G21C 15/00
(52) U.S. Cl. ...................... 428/636; 428/665; 376/906; 165/905
(58) Field of Search ................... 428/665, 636; 376/900, 906; 165/905

(56) References Cited

U.S. PATENT DOCUMENTS

| | | | | |
|---|---|---|---|---|
| 2,401,483 A | * | 6/1946 | Hensel et al. .............. 428/665 |
| 3,436,307 A | * | 4/1969 | Johnson et al. .............. 176/69 |
| 3,673,667 A | * | 7/1972 | Loewenstein et al. ....... 428/596 |
| 4,090,080 A | * | 5/1978 | Tosswill ..................... 250/366 |
| 4,211,354 A | * | 7/1980 | Hoffman et al. ............. 156/292 |
| 4,791,300 A | * | 12/1988 | Yin ........................ 250/363.01 |
| 4,923,673 A | * | 5/1990 | Litty ............................ 419/20 |
| 4,987,309 A | * | 1/1991 | Klasen et al. ............. 250/492.1 |
| 5,036,201 A | * | 7/1991 | Carroll et al. ............. 250/336.1 |
| 5,081,396 A | * | 1/1992 | Schneider et al. .......... 313/630 |
| 5,533,258 A | * | 7/1996 | Rainer et al. ............. 29/890.03 |
| 5,590,386 A | * | 12/1996 | Patrician et al. .............. 419/20 |
| 6,225,631 B1 | * | 5/2001 | Mastrippolito et al. 250/363.02 |

FOREIGN PATENT DOCUMENTS

| | | | |
|---|---|---|---|
| DE | 36 00 646 | | 7/1987 |
| JP | 63-235410 | * | 9/1988 |
| JP | 2-206788 | * | 8/1990 |
| JP | 4-115129 | * | 4/1992 |
| JP | 5-74413 | * | 3/1993 |
| JP | 9-111387 | * | 4/1997 |
| WO | WO 97/01108 | * | 1/1997 |

OTHER PUBLICATIONS

English translation of Japanese Kokai 4–115129 ("Tadokoro"). No date.

* cited by examiner

Primary Examiner—John J. Zimmerman
(74) Attorney, Agent, or Firm—Morgan & Finnegan, L.L.P.

(57) ABSTRACT

The invention provides a component or composite part, such as a divertor plate for the "first wall" of a fusion reactor, adapted to endure a high thermal load, which is made, at least in some sections, of tungsten or a tungsten alloy. In accordance with the invention, the sections are not constructed massively from tungsten or a tungsten alloy, but rather are made as a laminated packet, in order to improve the susceptibility to fissures.

7 Claims, 1 Drawing Sheet

COMPOSITE FOR HIGH THERMAL STRESS

BACKGROUND OF THE INVENTION

The present invention concerns a component or composite part for enduring high thermal stress, such as a divertor plate used as a "first wall" in a fusion reactor. The composite, at least in some sections, is made of tungsten or a tungsten alloy.

Components for enduring high thermal stress used, for example, as the "first wall" in a fusion reactor, are, as a rule, constructed as a composite. The side facing the plasma is used as a heat shield and is constructed of materials having a high melting point and good thermal conductivity, such as graphite, or metal materials, such as tungsten or molybdenum. The component acting as the heat shield is produced either as a massive, block-shaped heat sink or as an actively cooled heat sink, with a cooling agent flowing there through made of a material having good thermal conductivity. Such later materials have a lower melting point than the heat shield, and can be comprised of copper or copper alloy.

Tungsten or tungsten alloys would appear to be very well suited as components for enduring high thermal stress, particularly for use as a divertor in fusion reactors, because of their high mass number, good thermal properties, and because they have among the highest melting point of all metals. However, tungsten and tungsten alloys have not been widely used, to now, as components for enduring high thermal stress because these materials can be brittle, having a comparatively high ductile/brittle transition temperature. Hence, these materials are extremely susceptible to fissures when enduring thermal shock stress.

OBJECT OF THE INVENTION

The purpose of the present invention, therefore, is to provide components or composite parts used for enduring high thermal stress, for example, divertor plates used as the "first wall" in a fusion reactor, which are made, at least in some sections, of tungsten or a tungsten alloy.

DETAILED DESCRIPTION OF THE INVENTION

Figure 1:
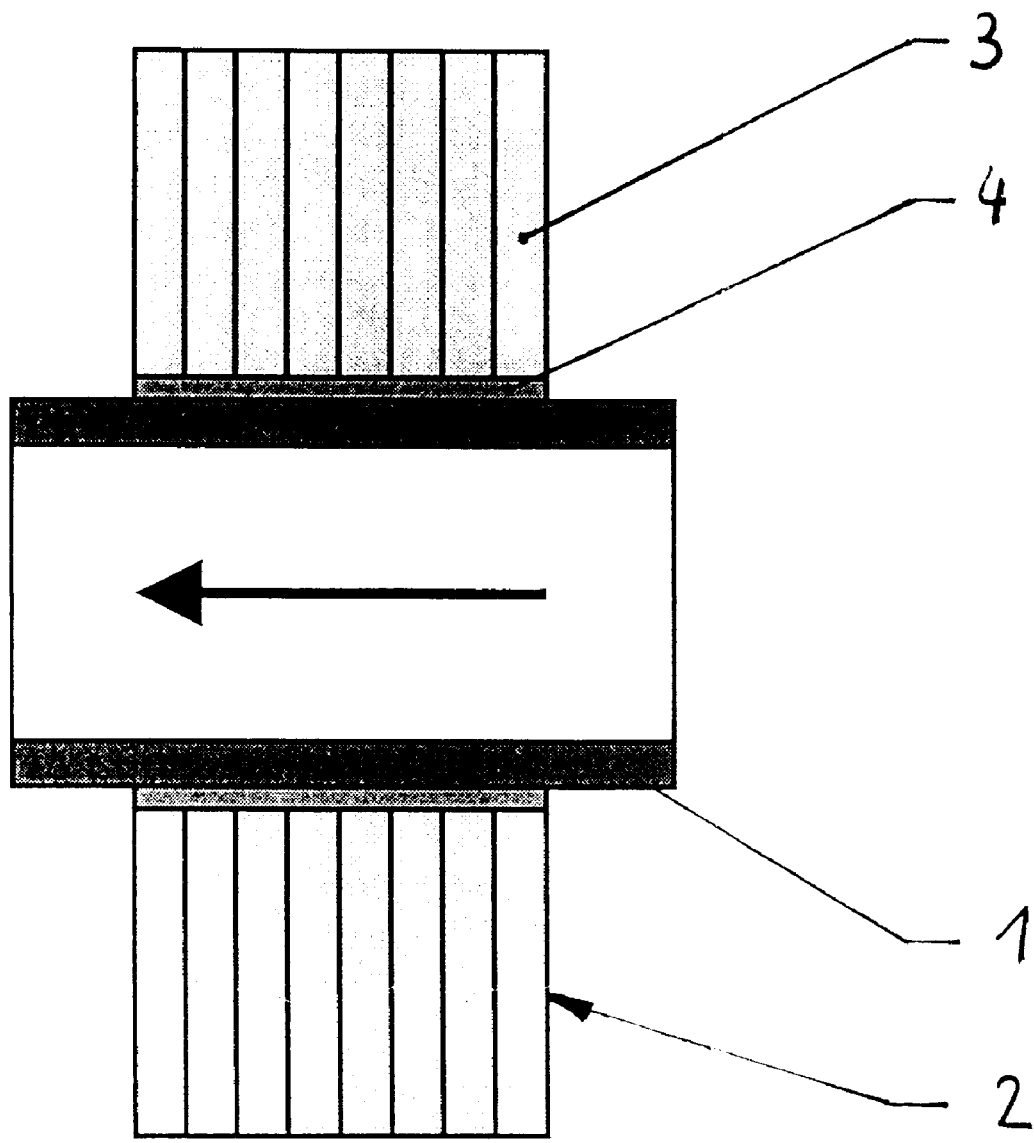
FIG. 1 shows the diagrammatic sketch of an actively cooled component for a fusion reactor.

According to the invention, composites comprised of tungsten and/or tungsten alloy are provided, which are not massively constructed, but rather are made as a laminated packet. This invention permits parts made of tungsten or a tungsten alloy to withstand higher specific thermal shock stress because the parts are provided in small thickness, rather than large masses.

In a particularly advantageous embodiment, the laminated packet is constructed of individual sheet metal sections each having a thickness from 0.1–2 mm.

In particular, a particle-reinforced alloy comprised of 0.3–5 vol % lanthanum oxide and the remainder tungsten has proven to be suitable. With the use of this alloy, a clear reduction in the formation and propagation of fissures is attained, in comparison to earlier pure tungsten materials.

In another advantageous development of the invention, the composite component adapted to endure high thermal stress is constructed as an actively cooled device wherein a cooling agent conducting tube, made of copper or a copper alloy, is provided, which is surrounded on all sides by a laminated tungsten and/or tungsten alloy packet.

The invention is explained in more detail below with the aid of an example and figure.

EXAMPLE

An actively cooled component for a fusion reactor according to FIG. 1, is provided, comprised of a cooling agent-conducting tube 1 made of a copper alloy, and a heat shield 2 surrounding the copper tube on all sides and made of a tungsten alloy comprised of 1 vol % lanthanum oxide, and the remainder tungsten. The component was produced in the following manner:

Individual tungsten plates 3 were produced from a 0.5-mm-thick sheet metal made of the tungsten alloy by cutting and punching a hole therein to surround and hold onto the copper tube. The individual plates 3 were stacked to form a 10-mm-thick packet. A cooling hole is provided having a 0.5-mm-thick copper layer 4 made according to a method described in U.S. Pat. No. 5,533,258. The plate packet obtained in this manner, made of tungsten alloy sheets 1, was joined together using high vacuum soldering and a continuous pipe 1 made of copper alloy, in a mechanically and thermally stable attaching manner. The component product, i.e., laminated packet product, produced in this manner was tested for fissure susceptibility under thermal shock stress conditions. It was determined that heat flows of up to 20 MW/m$^2$ could be attained even at more than 1000 thermal cycles without breaking the laminated packet made of tungsten alloy.

What is claimed is:

1. A composite product for enduring high thermal stress comprised of at least two sections of a particle-reinforced alloy comprised of 0.3–5 volume % lanthanum oxide and the remainder tungsten, wherein the sections are formed together as a laminated packet in abutting relation in a mechanically and thermally stable manner.

2. The composite product according to claim 1, wherein the laminated packet is comprised of individual sheet metal sections comprised of a particle-reinforced alloy comprised of 0.3–5 volume % lanthanum oxide and the remainder tungsten each having a thickness of about 0.1–2 mm.

3. A composite product for enduring high thermal stress comprised of at least two sections of a tungsten alloy,
    wherein the sections are formed together as a laminated packet, and
    wherein the product is actively cooled with a cooling agent conducting tube comprised of copper or a copper alloy, which conducting tube is surrounded on all sides by said laminated packet.

4. A composite product for enduring high thermal stress comprised of at least two sections of a tungsten alloy,
    wherein the sections are formed together as a laminated packet, and
    wherein the product is a divertor plate for use as a first wall in a fusion reactor.

5. A composite product for enduring high thermal stress comprised of at least two sections of tungsten, wherein the sections are formed together as a laminated packet in abutting relation in a mechanically and thermally stable manner, and wherein the product is actively cooled with a cooling agent conducting tube comprised of copper or a copper alloy, which conducting tube is surrounded on all sides by said laminated packet.

6. The composite product according to claim 5, wherein the laminated packet is comprised of individual sheet metal sections comprised of tungsten each having a thickness of about 0.1–2 mm.

7. The composite product according to claim 5,
wherein the sections are formed together as a laminated packet, and
wherein the product is a divertor plate for use as a first wall in a fusion reactor.

\* \* \* \* \*